US011600875B2

(12) United States Patent
Robert et al.

(10) Patent No.: US 11,600,875 B2
(45) Date of Patent: Mar. 7, 2023

(54) VEHICLE HIGH VOLTAGE BATTERY CELL ASSEMBLY

(71) Applicant: Ford Global Technologies, LLC, Dearborn, MI (US)

(72) Inventors: Brian Joseph Robert, St. Clair Shores, MI (US); Andrew Robert Drews, Ann Arbor, MI (US); Mohan Karulkar, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1065 days.

(21) Appl. No.: 15/873,028

(22) Filed: Jan. 17, 2018

(65) Prior Publication Data

US 2019/0221786 A1  Jul. 18, 2019

(51) Int. Cl.
| | | |
|---|---|---|
| *H01M 50/116* | (2021.01) | |
| *H01M 50/124* | (2021.01) | |
| *H01M 10/625* | (2014.01) | |
| *H01M 10/659* | (2014.01) | |
| *H01M 10/647* | (2014.01) | |

(Continued)

(52) U.S. Cl.
CPC ....... *H01M 50/124* (2021.01); *H01M 10/625* (2015.04); *H01M 10/647* (2015.04); *H01M 10/659* (2015.04); *H01M 50/10* (2021.01); *H01M 50/116* (2021.01);
(Continued)

(58) Field of Classification Search
CPC .. H01M 2/0287; H01M 2/0262; H01M 2/024; H01M 2/1027; H01M 2/0285; H01M 2/0277; H01M 2/0215; H01M 2/1258; H01M 2/12; H01M 2/1235; H01M 2/345; H01M 2/348; H01M 2200/00; H01M 10/625; H01M 10/647; H01M 10/659; H01M 10/613; H01M 10/656; H01M 50/124; H01M 50/10; H01M 50/116; H01M 50/267; H01M 50/555; H01M 50/103; H01M 50/105; H01M 50/136;
(Continued)

(56) References Cited

U.S. PATENT DOCUMENTS

| | | |
|---|---|---|
| 8,518,569 B2 | 8/2013 | Murphy et al. |
| 9,172,072 B2 | 10/2015 | Shibata et al. |

(Continued)

FOREIGN PATENT DOCUMENTS

| | | |
|---|---|---|
| DE | 102008006920 A1 | 7/2009 |
| JP | 1925725 B2 | 5/2012 |

*Primary Examiner* — Kiran Quraishi Akhtar
(74) *Attorney, Agent, or Firm* — David B. Kelley; Brooks Kushman P.C.

(57) ABSTRACT

A traction battery cell assembly including a battery cell and a cell case is provided. The cell case defines a cavity sized for receiving the battery cell and includes an inner wall, an outer wall, and a plurality of support chambers disposed between the inner wall and the outer wall. Each of the support chambers defines a polygon having multiple sides. The sides are arranged with one another to define an agent cavity to house neutralizing agent. The plurality of support chambers is arranged with the inner wall and the outer wall such that an impact to one of the walls causes a puncture to one of the sides of the support chambers releasing the neutralizing agent. Each of the support chambers may include five or more sides and adjacent sides may define an angle therebetween greater than ninety degrees.

20 Claims, 3 Drawing Sheets

(51) Int. Cl.
   *H01M 50/10*    (2021.01)
   *H01M 50/267*   (2021.01)
   *H01M 50/555*   (2021.01)

(52) U.S. Cl.
   CPC ....... *H01M 50/267* (2021.01); *H01M 50/555* (2021.01); *H01M 2200/00* (2013.01)

(58) Field of Classification Search
   CPC .... H01M 50/126; H01M 50/14; H01M 50/55; Y02E 60/10; Y02T 10/70
   See application file for complete search history.

(56) References Cited

U.S. PATENT DOCUMENTS

| | | | |
|---|---|---|---|
| 9,224,997 B2 | 12/2015 | Osswald | |
| 2003/0049519 A1* | 3/2003 | Ishida | H01M 4/13 429/57 |
| 2011/0111270 A1* | 5/2011 | Osswald | H01M 2/1022 429/53 |
| 2013/0171483 A1* | 7/2013 | Shibata | H01M 2/12 429/56 |

* cited by examiner

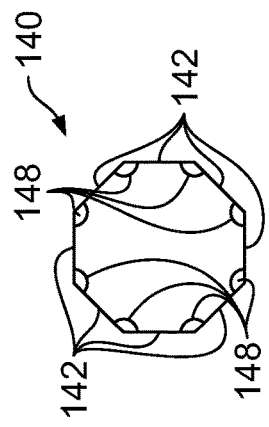
FIG. 4
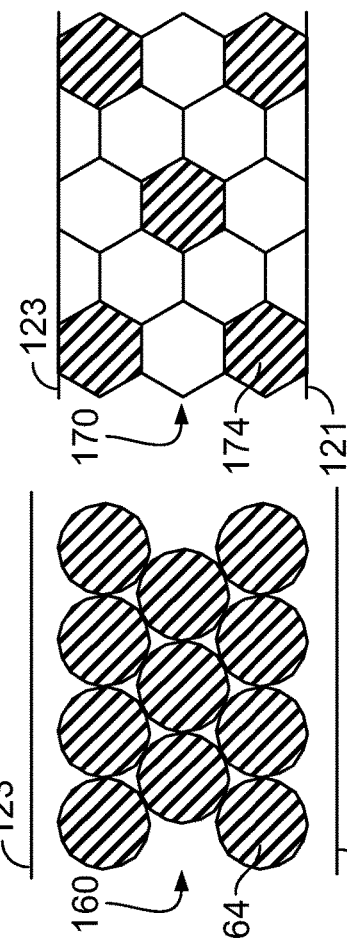
FIG. 5A
FIG. 5B
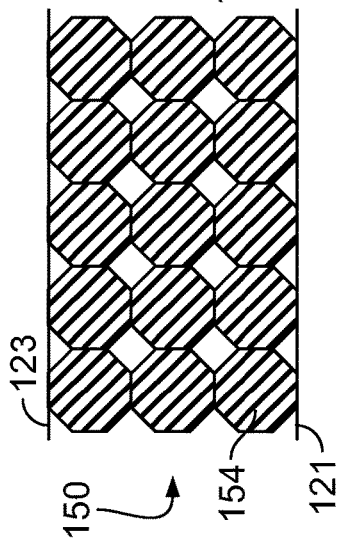
FIG. 6A
FIG. 6B
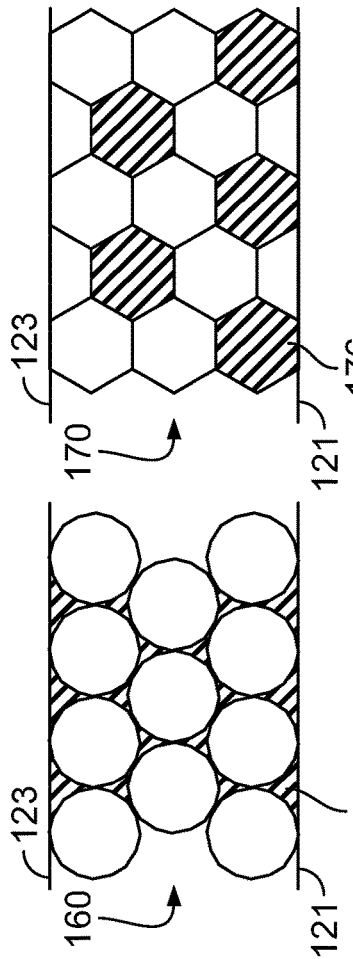
FIG. 7A
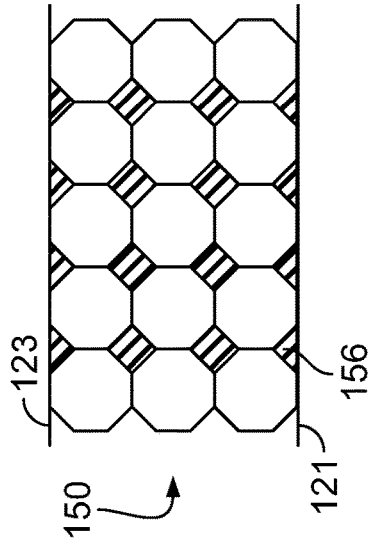
FIG. 7B

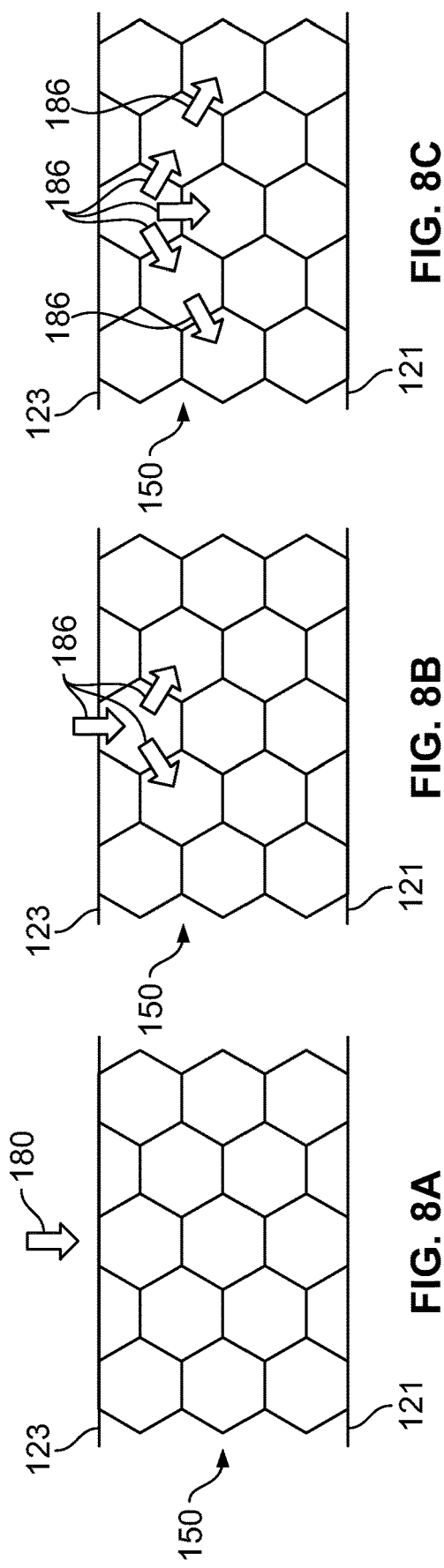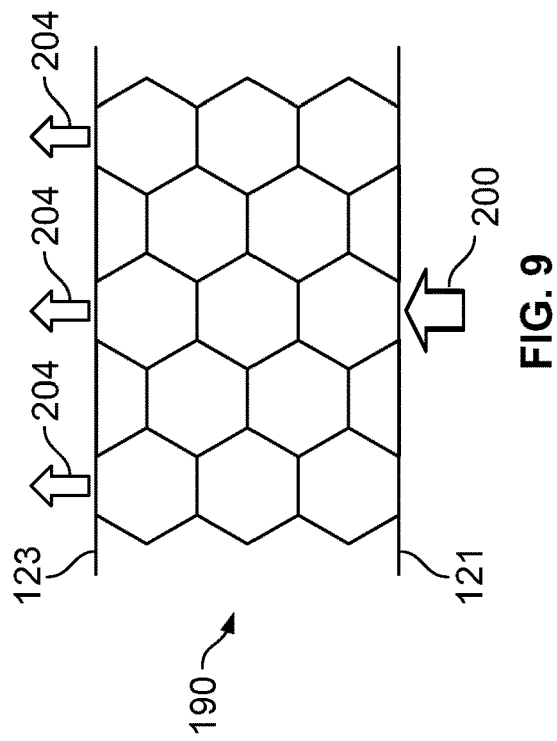

VEHICLE HIGH VOLTAGE BATTERY CELL ASSEMBLY

TECHNICAL FIELD

This disclosure relates to battery cell packaging for vehicle high voltage batteries.

BACKGROUND

In vehicle traction battery assemblies, battery cell structures may experience a variety of thermal and mechanical conditions throughout the structure's lifetime which may result in issues for the battery cell structure. For example, structural limitations of current pouch cases and metal cases do not necessarily accommodate for electrode expansion or damage as a result of vehicle impacts.

SUMMARY

A traction battery cell assembly includes a battery cell and a cell case. The cell case is for housing the battery cell and includes an inner wall, an outer wall, and a layer including a plurality of support chambers each having a membrane with five or more sides disposed between the inner wall and the outer wall. Each of the five or more sides is arranged with an adjacent side to define an angle greater than ninety degrees. A neutralizing agent may be disposed within one of the support chambers. The support chambers are arranged within the layer such that puncturing the one of the support chambers releases the neutralizing agent. A neutralizing agent may be disposed between three or more support chambers. The three or more support chambers may be arranged within the layer such that the neutralizing agent travels toward an impact to the inner wall. A phase change material may be disposed between the five or more sides. The phase change material may be selected based on phase change properties related to temperature. The selected phase change material may absorb heat and transition from a solid state to a liquid state when exposed to a temperature above a predetermined threshold. Each of the five or more sides may be of a flexible material. The plurality of support chambers may be arranged such that the each of the five or more sides of a respective support chamber flexes when the outer wall is subjected to an impact. The five or more sides may be further arranged with one another such that load paths from a force applied to the outer wall are distributed over an area greater than an area at a point of the force application.

A traction battery cell assembly includes a battery cell and a cell case. The cell case defines a cavity sized for receiving the battery cell and includes an inner wall, an outer wall, and a plurality of support chambers disposed between the inner wall and the outer wall. Each of the support chambers defines a polygon having multiple sides. The sides are arranged with one another to define an agent cavity to house neutralizing agent. The plurality of support chambers is arranged with the inner wall and the outer wall such that an impact to one of the walls causes a puncture to one of the sides of the support chambers releasing the neutralizing agent. Each of the support chambers may include five or more sides and adjacent sides may define an angle therebetween greater than ninety degrees. Each of the support chambers may include three sides to form a triangular shape. The multiple sides may be further arranged with one another such that load paths from a force applied to the outer wall are distributed over an area greater than an area at a point of the force application. A phase change material may be disposed between the five or more sides. The phase change material may be selected based on phase change properties related to temperature. The selected phase change material may absorb heat and transition from a solid state to a liquid state when exposed to a temperature above a predetermined threshold.

A traction battery cell assembly includes an inner wall, an outer wall, a cap, a first terminal, and a second terminal. The inner wall defines a battery cavity to receive a battery cell and defines an opening. The outer wall is spaced from the inner wall to define a layer cavity to receive a support layer. The cap is sized to close off the opening and defines a first aperture and a second aperture. The first terminal extends from the battery cell and through the first aperture. The second terminal extends from the battery cell and through the second aperture. The support layer includes a plurality of support chambers shaped to divert load paths from a force applied to the inner or outer wall across angled sides of each of the plurality of support chambers. A neutralizing agent may be disposed at one of a location within each of the support chambers and between adjacent support chambers. The neutralizing agent may be released upon a puncture of one of the outer walls or a respective support chamber. Each of the support chambers may include multiple sides defining a membrane. The support chambers may be further shaped such that adjacent sides of the multiple sides form an angle less than ninety degrees or an angle greater than ninety degrees. Each of the angled sides may be of a flexible material. The plurality of support chambers may be arranged such that the each of the angled sides of a respective support chamber flexes when the outer wall is subjected to an impact. The support chambers may be spaced from the inner wall and the outer wall providing spaces for the inner and outer wall to flex upon receipt of a force.

BRIEF DESCRIPTION OF THE DRAWINGS

FIG. 4 is a side view, in cross section, of a support chamber of a layer of a battery cell case of a battery cell assembly.

FIG. 5A is a side view, in cross-section, of an example of a portion of a support layer of a battery cell case of a battery cell assembly.

FIG. 5B is a side view, in cross-section, of an example of a portion of a support layer of a battery cell case of a battery cell assembly.

FIG. 6A is a side view, in cross-section, of an example of a portion of a support layer of a battery cell case of a battery cell assembly.

FIG. 6B is a side view, in cross-section, of an example of a portion of a support layer of a battery cell case of a battery cell assembly.

FIG. 7A is a side view, in cross-section, of an example of a portion of a support layer of a battery cell case of the battery cell assembly of FIG. 1

FIG. 7B is a side view, in cross-section, of an example of a portion of a support layer of a battery cell case of a battery cell assembly.

FIG. 8A is a side view, in cross-section, of an example of a portion of a support layer of a battery cell case of a battery cell assembly illustrating an application of a force to the battery cell case.

FIG. 8B is a side view, in cross-section, of the portion of the support layer of FIG. 8A illustrating a transfer of load paths from the force of FIG. 8A through the support layer of FIG. 8A.

FIG. 8C is a side view, in cross-section, of the portion of the support layer of FIG. 8A further illustrating the transfer of load paths from the force of FIG. 8A through the support layer of FIG. 8A.

FIG. 9 is a side view, in cross-section, of an example of a portion of a support layer of a battery cell case of a battery cell assembly illustrating an example of heat transfer through the support layer.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
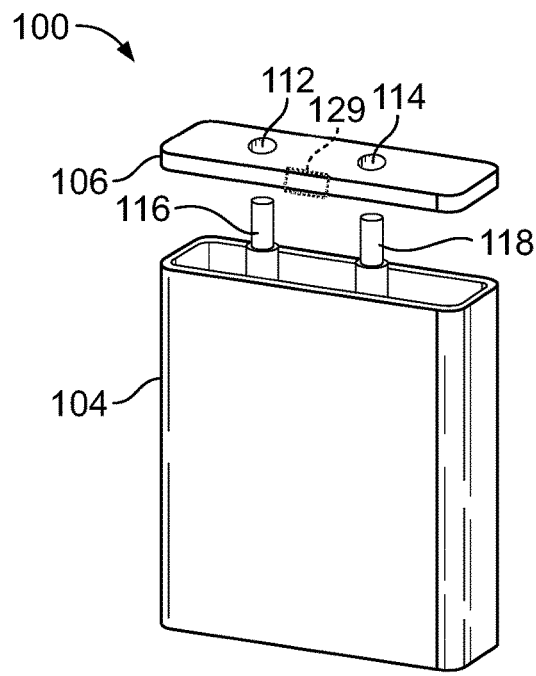
FIG. 1 is a perspective view of an example of a battery cell assembly of a vehicle traction battery.

FIG. 1 illustrates an example of a battery cell assembly, referred to generally as a battery cell assembly 100 herein. The battery cell assembly 100 includes a cell case 104 and a case cap 106. The cell case 104 defines a cavity sized to receive a battery cell. The case cap 106 defines a first aperture 112 and a second aperture 114. The battery cell includes components to generate energy and a first terminal 116 and a second terminal 118 to transfer the energy from the components. The first aperture 112 and the second aperture 114 are each sized for one of the first terminal 116 or the second terminal 118 to extend therethrough when the case cap 106 is mounted to the cell case 104.

The cell case 104 includes an inner wall defining the cavity to receive the battery cell 109 and an outer wall spaced from the inner wall 121. A support layer 127 is disposed between the inner wall and the outer wall. The support layer 127 is structured to assist in mitigating impact energy absorption, contain one or more neutralizing agents for release upon cell failures, and a reduce a weight of the cell case 104 in comparison to previous designs. In one example, support layer 127 may include a plurality of individual support chambers as further described herein.

Figure 2:
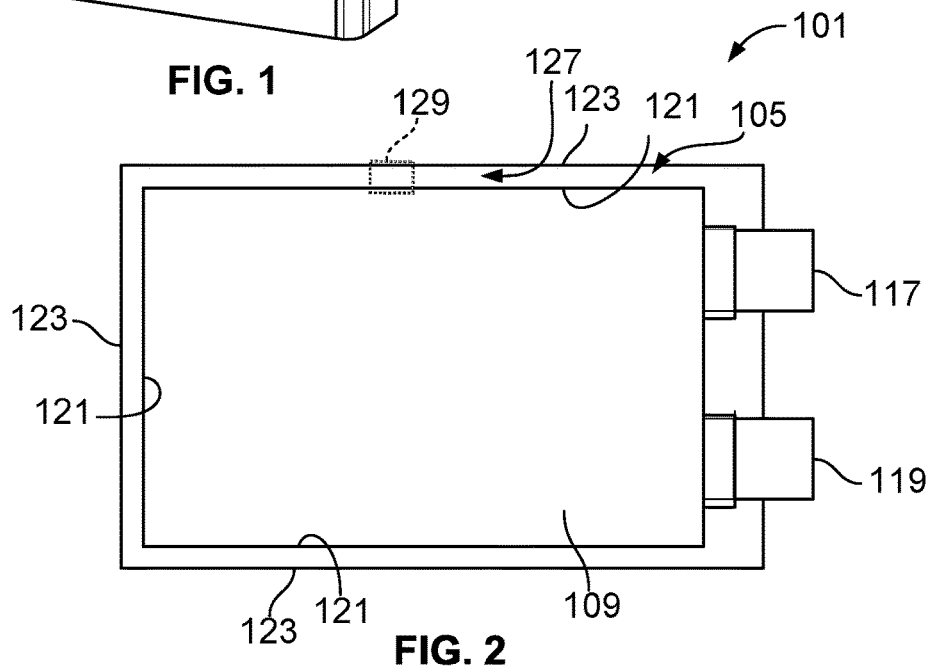
FIG. 2 is a front view, in cross-section, of another example of a battery cell assembly.

FIG. 2 illustrates another example of a battery cell assembly, referred to generally as a battery cell assembly 101. The battery cell assembly 101 includes a structured frame referred to as a cell case 105 herein. The cell case 105 defines a cavity sized to receive a battery cell 109. The battery cell 109 includes components to generate energy and a first terminal 117 and a second terminal 119 to transfer the energy from the components. The cell case 105 defines a first aperture and a second aperture for terminals to extend therethrough. The first aperture and the second aperture are each sized for one of the first terminal 117 or the second terminal 119 to extend therethrough.

The cell case 105 includes an inner wall 121 defining the cavity to receive the battery cell 109 and an outer wall 123 spaced from the inner wall 121. Each of the inner wall 121 and the outer wall 123 may be of a flexible material to assist in managing impact loads to assist in protecting the battery cell 109. It is contemplated that the inner wall 121 may be of a material having properties different than a material of the outer wall 123. For example, it may be desirable for a material of the inner wall 121 to have rigid characteristics and a material of the outer wall 123 to have flexible characteristics. In another example, it may be desired for a material of the inner wall 121 to have a lower melting point than a material of the outer wall 123.

A support layer 127 is disposed between the inner wall 121 and the outer wall 123. The support layer 127 is structured to assist in mitigating impact energy absorption, contain one or more neutralizing agents for release upon cell failures, and a reduce a weight of the cell case 105 in comparison to previous designs. In one example, the support layer 127 may include a plurality of individual support chambers.

Figure 3:
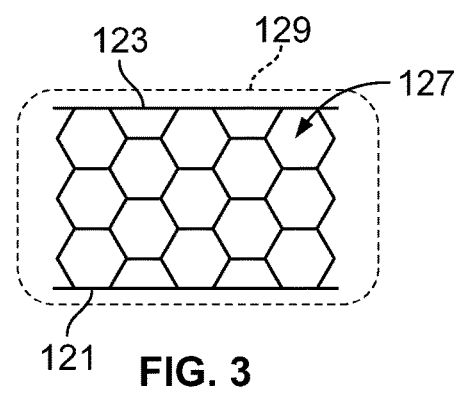
FIG. 3 is a front view, in cross-section, of a portion of a battery cell case or frame of the battery cell assembly of FIGS. 1 and 2.

FIG. 3 is a cross-sectional view of a portion of a cell case illustrating an example of a structure for a support layer, such as the support layer the cell case 104 or the cell case 105 identified as a region 129. The region 129 represented by broken lines is shown in FIGS. 1 and 2 as examples of a location of the support layer. In FIG. 3, the support layer 127 includes a plurality of hexagonal-shaped support chambers arranged with one another to define a honeycomb-like structure. Each of the support chambers includes a membrane having multiple sides defining angles between two adjacent sides. In one example in which the multiple sides are of a rigid or flexible material, each of the angles may be less than ninety degrees or greater than ninety degrees to assist in transferring load paths from impacts received by the outer wall 123 as further described below. In another example in which the multiple sides are of a flexible material, each of the angles may be approximately ninety degrees. Selection of the angles between the multiple sides may be based on a thickness of each of the multiple sides.

FIG. 4 illustrates an example of one of the support chambers, referred to as a support chamber 140. In this example, the support chamber 140 includes eight sides 142 defining a membrane. Each of the sides 142 is connected to two other sides 142 defining an angle 148 between two adjacent sides 142. In this example, each of the angles 148 is approximately 135°. Various shapes are available for each support chamber 140 having an angle between adjacent sides greater than 90° or less than 90° (e.g. a triangle shape).

FIGS. 5A through 7B illustrate other examples of shapes for the support chambers of the cell case 104 and the cell case 105. While the collections of support chambers in FIGS. 5A through 7B are shown as similar to one another, it is contemplated that a respective support layer may comprise a collection of various shaped support chambers. The various shaped support chambers may be organized based on desired performance to selectively direct load paths from impacts to the battery cell. For example, the support chambers located near the inner wall 121 or the outer wall 123 may be larger or smaller than support chambers located therebetween. Additionally, each side of a respective support chamber may be of a flexible material to flex when an impact is received by the inner wall 121 or the outer wall 123 to assist in mitigating load paths generated by the impact. Further, the support chambers may be spaced from the inner wall 121 and the outer wall 123 as shown in FIG. 6A to provide clearance for the inner wall 121 and/or the outer wall 123 to flex when a force is received In FIGS. 5A and 5B, a support layer 150 is shown disposed between the inner wall 121 and the outer wall 123. The support layer 150 includes a plurality of the support chambers 140 defining an octagonal shape having eight sides. A neutralizing agent may be disposed within one or more of the support chambers 140 or between adjacent support chambers. The neutralizing agent may operate to assist in mitigating or eliminating potential failure issues of a battery cell. For example, a neutralizing agent 154 represented by shaded portions in FIG. 5A may be disposed within each of the support chambers 140. In another example, one or more neutralizing agents 156 represented by shaded portions in FIG. 5B may be disposed between the support chambers 140.

Each neutralizing agent may be disposed within a respective support chamber 140 or between adjacent support chambers 140 such that when punctured, the neutralizing agent is released to assist in mitigating or neutralizing a battery cell failure. For example, an impact to a battery cell may cause one or more chemicals to be released. The support chambers 140 may be arranged such that one or more of the sides of the support chambers 140 may be punctured from the impact to release the neutralizing agent contained therein or therebetween. The neutralizing agent may contact the one or more chemicals released by the battery cell to assist in mitigating any resulting damage.

In FIGS. 6A and 6B, a support layer 160 is shown disposed between the inner wall 121 and the outer wall 132. The support layer 160 includes a plurality of support chambers each defining a twelve-sided polygon such as a dodecagon. In this example, an angle may be defined between two adjacent sides of approximately 150°. A neutralizing agent may be disposed within one or more of the plurality of support chambers or between adjacent support chambers. As described above, the neutralizing agent may operate to assist in mitigating potential failure issues of a battery cell. For example, a neutralizing agent 164 represented by shaded portions in FIG. 6A may be disposed within each of the support chambers of the support layer 160. In another example, one or more neutralizing agents 166 represented by shaded portions in FIG. 5B may be disposed between the support chambers of the support layer 160.

In FIGS. 7A and 7B, a support layer 170 is shown disposed between the inner wall 121 and the outer wall 123. The support layer 170 includes a plurality of support chambers each defining a six-sided polygon such as a hexagon. In this example, an angle may be defined between two adjacent sides of approximately 120°. A neutralizing agent may be disposed within one or more of the plurality of support chambers or between adjacent support chambers. As described above, the neutralizing agent may operate to assist in mitigating or eliminating potential failure issues of a battery cell. For example, a neutralizing agent 174 represented by shaded portions in FIG. 7A may be disposed within each of the support chambers of the support layer 170. In another example, one or more neutralizing agents 176 represented by shaded portions in FIG. 7B may be disposed between the support chambers of the support layer 170.

The angle relationship between sides of the support chambers and additional vertices may also assist in managing loads received from impact forces to the battery cell. For example, FIGS. 8A through 8C illustrate an example of load path transfer as a result of a structure of the support chambers of support layer 150. In FIG. 8A, a force represented by force arrow 180 is applied to the outer wall 122. The force may be related to an impact to the cell case 104 or cell case 105. In FIG. 8B, force arrows 186 represent a load path resulting from the force represented by the force arrow 180 shown traveling in a direction away from the inner wall. Angles defined between each of the sides of the support chambers operate to change a direction of a portion of the load path to travel across an angled side instead of directly toward the battery cell. Angle values less than ninety degrees and greater than ninety degrees assist in influencing load paths to not directly travel toward the battery cell. It is contemplated that angle values of approximately ninety degrees may be acceptable based on an appropriate thickness of each of the sides. Additionally, the sides may be arranged with one another such that load paths from a force applied to the outer wall are distributed over an area greater than an area at a point of the force application Each of the support chambers may also be structured to assist in managing thermal transfer across the cell case 104 or the cell case 105 as illustrated in FIG. 9. In FIG. 9, a support layer 190 is shown disposed between the inner wall 121 and the outer wall 123. Heat arrow 200 represents a heat source to the inner wall 121. For example, the heat arrow 200 may represent an increase in heat flow experienced by a portion of a battery cell, such as from a hot spot from a battery cell. Sides of support chambers of the support layer 190 may be of a material to assist in managing the heat represented by the heat arrow 200. In another example, phase change material may be disposed within one or more support chambers of the support layer 190. The phase change material may be selected based on phase change properties related to temperature, such as a material's latent heat in transition from a solid state to a liquid state when exposed to a temperature above a predetermined threshold.

The phase change material within the support chambers of support layer 190 may begin transitioning from a solid state when exposed to heat represented by the heat arrow 200. The heat may be absorbed as the phase change material transitions such that the heat is spread out across the outer wall 123 in a more uniform and dispersed pattern as represented by heat arrows 204.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery cell assembly comprising:
a battery cell; and
a cell case for housing the battery cell and including an inner wall, an outer wall, and a layer including a plurality of fluidly isolated individual support chambers each having a membrane with five or more sides disposed between the inner wall and the outer wall, wherein each of the five or more sides is arranged with an adjacent side to define an angle greater than ninety degrees.

2. The assembly of claim 1 further comprising a neutralizing agent disposed within at least one of the fluidly isolated individual support chambers, wherein the plurality of fluidly isolated individual support chambers are arranged within the layer such that puncturing one of the support chambers releases the neutralizing agent.

3. The assembly of claim 1 further comprising a neutralizing agent disposed between three or more support chambers, wherein the plurality of fluidly isolated individual support chambers are arranged within the layer such that the neutralizing agent travels toward an impact to the inner wall.

4. The assembly of claim 1, wherein a phase change material is disposed between the five or more sides.

5. The assembly of claim 4, wherein the phase change material is selected based on phase change properties related to temperature, and wherein the selected phase change material absorbs heat and transitions from a solid state to a liquid state when exposed to a temperature above a predetermined threshold.

6. The assembly of claim 1 wherein each of the five or more sides is of a flexible material, and wherein the plurality of fluidly isolated individual support chambers is arranged such that the each of the five or more sides of a respective support chamber flexes when the outer wall is subjected to an impact.

7. The assembly of claim 1, wherein the five or more sides are further arranged with one another such that load paths from a force applied to the outer wall are distributed over an area greater than an area at a point of the force application.

8. A traction battery cell assembly comprising:
a battery cell; and
a cell case defining a cavity sized for receiving the battery cell and including an inner wall, an outer wall, and a plurality of fluidly isolated individual support chambers disposed between the inner wall and the outer wall, wherein each of the fluidly isolated individual support chambers defines a polygon having multiple sides, wherein the sides are arranged with one another to define an agent cavity to house neutralizing agent, and wherein the plurality of fluidly isolated individual support chambers is arranged with the inner wall and the outer wall such that an impact to one of the walls causes a puncture to one of the sides of the support chambers releasing the neutralizing agent.

9. The assembly of claim 8, wherein each of the fluidly isolated individual support chambers includes five or more sides, and wherein adjacent sides define an angle therebetween greater than ninety degrees.

10. The assembly of claim 8, wherein each of the fluidly isolated individual support chambers includes three sides to form a triangular shape.

11. The assembly of claim 8, wherein the multiple sides are further arranged with one another such that load paths from a force applied to the outer wall are distributed over an area greater than an area at a point of the force application.

12. The assembly of claim 8, wherein a phase change material is disposed between the five or more sides.

13. The assembly of claim 12, wherein the phase change material is selected based on phase change properties related to temperature, and wherein the selected phase change material absorbs heat and transitions from a solid state to a liquid state when exposed to a temperature above a predetermined threshold.

14. A traction battery cell assembly comprising:
an inner wall defining a battery cavity to receive a battery cell and defining an opening;
an outer wall spaced from the inner wall to define a layer cavity to receive a support layer;
a cap sized to close off the opening and defining a first aperture and a second aperture;
a first terminal extending from the battery cell and through the first aperture; and
a second terminal extending from the battery cell and through the second aperture,
wherein the support layer includes a plurality of fluidly isolated individual support chambers shaped to divert load paths from a force applied to the inner or outer wall across angled sides of each of the plurality of fluidly isolated individual support chambers.

15. The assembly of claim 14 further comprising neutralizing agent disposed at one of a location within at least one of the fluidly isolated individual support chambers and between adjacent fluidly isolated individual support chambers, wherein the neutralizing agent is released upon a puncture of one of the outer walls or a respective fluidly isolated individual support chamber.

16. The assembly of claim 14, wherein the fluidly isolated individual support chambers include multiple sides defining a membrane, and wherein the fluidly isolated individual support chambers are further shaped such that adjacent sides of the multiple sides form an angle less than ninety degrees or an angle greater than ninety degrees.

17. The assembly of claim 14, wherein each of the angled sides is of a flexible material, and wherein the plurality of fluidly isolated individual support chambers is arranged such that the each of the angled sides of a respective support chamber flexes when the outer wall is subjected to an impact.

18. The assembly of claim 14, wherein the fluidly isolated individual support chambers are spaced from the inner wall and the outer wall providing spaces for the inner and outer wall to flex upon receipt of a force.

19. The assembly of claim 8 wherein neutralizing agent is housed within intermittently-spaced ones of the plurality of fluidly isolated individual support chambers.

20. The assembly of claim 15 wherein neutralizing agent is housed within intermittently-spaced ones of the plurality of fluidly isolated individual support chambers.

\* \* \* \* \*